United States Patent [19]

Paldino

[11] Patent Number: 4,653,709

[45] Date of Patent: Mar. 31, 1987

[54] TILT-PAN HEAD FOR CAMERAS

[76] Inventor: Arthur J. Paldino, 470 Halstead Ave., Harrison, N.Y. 10528

[21] Appl. No.: 850,537

[22] Filed: Apr. 11, 1986

[51] Int. Cl.[4] .............................................. F16M 11/12

[52] U.S. Cl. .................................... 248/183; 248/278; 248/288.5; 354/293; 403/53; 403/55

[58] Field of Search ............... 248/183, 177, 178, 179, 248/180, 181, 182, 176, 278, 288.3, 288.5, 1 F, 1 H, 1 I; 354/293, 294; 403/55, 53, 84, 74, 76, 90

[56] References Cited

U.S. PATENT DOCUMENTS

| | | | |
|---|---|---|---|
| 2,384,790 | 9/1945 | Bolsey | 248/183 |
| 3,180,603 | 4/1965 | O'Connor | 248/183 |
| 3,352,521 | 11/1967 | Tyler | 354/293 X |
| 3,364,810 | 1/1968 | Hickerson | 248/180 X |
| 3,490,724 | 1/1970 | Ichikawa | 248/178 |
| 3,782,671 | 1/1974 | Igwe | 248/183 |
| 3,881,675 | 5/1975 | Matchett | 248/178 X |
| 4,010,923 | 3/1977 | Miller et al. | 248/183 |
| 4,247,069 | 1/1981 | Kurz | 248/183 X |
| 4,420,238 | 12/1983 | Felix | 248/183 X |
| 4,457,610 | 7/1984 | Kawazoe | 248/183 X |

*Primary Examiner*—J. Franklin Foss
*Assistant Examiner*—David L. Talbott
*Attorney, Agent, or Firm*—Martin J. Spellman, Jr.

[57] ABSTRACT

The present invention provides a tilt-pan head for controlling the movement of instruments in which panning and tilting motions are required. Each function, the pan drag, the tilt drag, the pan locking and the tilt locking are controlled by four coaxially mounted knurled control rings that are stacked one on top of the other, and independently rotatable to control an individual applicable function.

2 Claims, 19 Drawing Figures

TILT-PAN HEAD FOR CAMERAS

BACKGROUND OF THE INVENTION

1. FIELD OF THE INVENTION

This invention relates to the tilt-pan head for a camera or other instrument wherein it is required to rotate the instrument about a vertical axis and to tilt it up and down about a horizontal axis. It is very desirable that the frictional drag of both tilt and the panning motion be capable of being carefully regulated and that the same friction or "feel" may be maintained even when the camera or other instrument is intermittently locked in its panning motion or both panning and tilting motion together. It is particularly applicable to utilization with commercial television cameras in which the precise control of such motions is especially critical.

Also, it is highly desirable that the control of the tilt and panning frictional drag as well as the control of the locking of both the tilt and panning motion be readily controllable by the camera operator by a simplified motion and without having to visually reference the control instrumentality.

In addition, it is highly desirable that such a mechanism be relatively maintenance-free and constructed of durable materials.

2. PRIOR ART

There does not exist at the present time, as far as applicant knows, any tilt-pan head mechanism wherein the tilt drag, the pan drag and the locking of the tilt and pan motion may be controlled by simple turning motions of four stacked rings by the operator.

Most existing tilt-pan head arrangements require varied movements to effectuate the controls and in most cases the pan friction and the tilt friction are used both to regulate the motion as well as lock or completely inhibit motion. Representative existing tilt-pan systems are shown in U.S. Pat. Nos. 4,420,238, 4,247,069, 4,457,610, 4,010,923 and 3,352,521. None of these prior art references of which Applicant is aware disclose or suggest the pan and tilt control for cameras of the present invention.

SUMMARY OF THE INVENTION

The present invention provides a tilt-pan head for controlling the movement of instruments in which a panning and tilting motion are required and wherein it is extremely important to be able to independently carefully control and regulate the amount of frictional drag of both the panning and the tilting motion. It is important as well to be able to completely inhibit or lock the tilt motion or the panning motion and tilting motion, and thereafter to be able to release the lock of each motion and to obtain the same frictional resistance or "feel" that existed prior to the lock.

It is thus important to have independent means for controlling the frictional drag of the panning motion and other independent means for controlling the frictional drag of the tilting motion as well as separate means for locking or inhibiting the panning, and both tilting and panning motions.

The present invention provides a tilt-pan head which allows for a smooth and substantially effortless panning motion and tilting motion from a central axis point. Both the motions of tilting and panning are controlled independently of each other by increasing or decreasing the amount of frictional drag applied to the mechanisims.

It is an important feature that both the tilt and panning motions are independently inhibited without effecting the other functions. Each function, the pan drag, the tilt drag, locking pan and locking tilt and pan are controlled by four coaxially mounted knurled control rings that are stacked one on top of the other, and independently rotatable to control an individual applicable function.

The rings are coaxially mounted with the uppermost ring controlling the friction applied to a center panning column by a set of frictional slide assemblies. The panning locking mechanism is controlled by the next lower ring and allows for the application of a second set of frictional slide assemblies to the panning column to a degree that totally inhibits the turning of the column. The next lower ring is a locking ring which through the action of pins which are raised or lowered by inclined planes when the ring is rotated. These pins in turn raise a retaining ring carrying an O ring to bear against the cradle sections to completely lock the cradle in place to prevent both panning and tilting motions. Tilting drag is controlled by fourth or next lower most ring and this ring is rotated after being pushed in to engage any one or more of three planetary gears to engage one or more sets of spring loaded gears to engage a floating gear on the control column to move it up or down causing a frictional wedge at the top of the control column to bear against the cradle sections supporting the camera mount.

BRIEF DESCRIPTION OF THE DRAWING

In the accompanying drawing which forms a part of the specification.

FIG. 12 is a sectional view along line 12—12 of FIG. 11 through all four ring levels of the control assembly.

DESCRIPTION OF ILLUSTRATIVE EMBODIMENT

Figure 1:
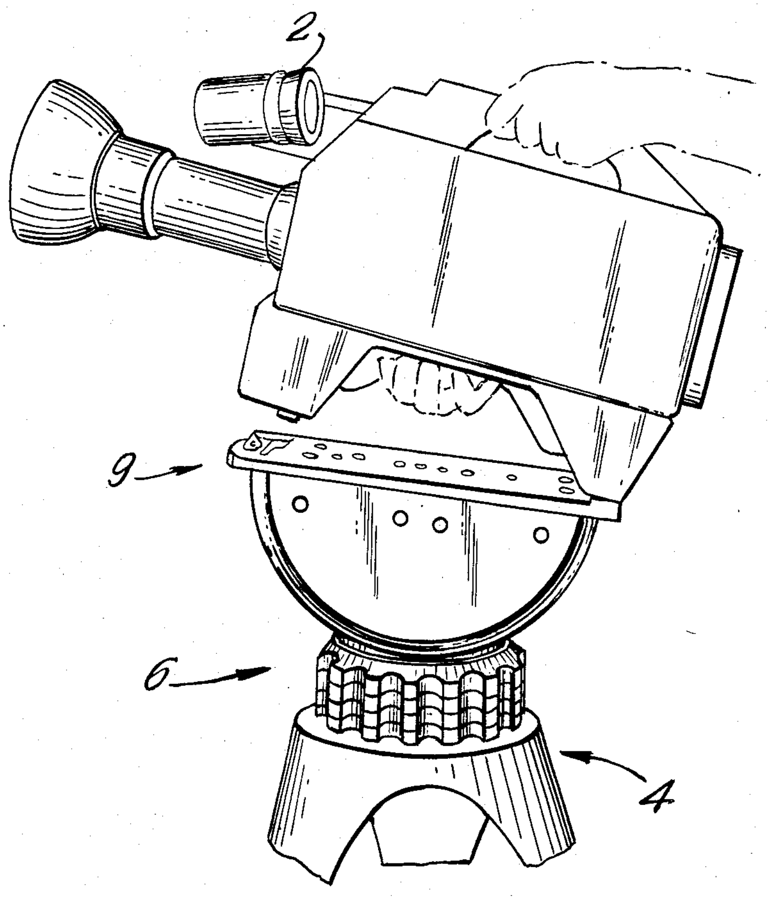
FIG. 1 is a general overall view of a television camera being mounted on the improved tilt pan head of the present invention at the top of a tripod support.

As shown in the accompanying drawing, a television camera 2 is shown mounted atop a tripod 4 or other support base and carried by the tilt pan head control device 6 of the present invention. The camera 2 is secured to the tilt pan head 6 of this invention by means of beveled mounting plate 10 having a beveled edge 11.

Figure 1A:
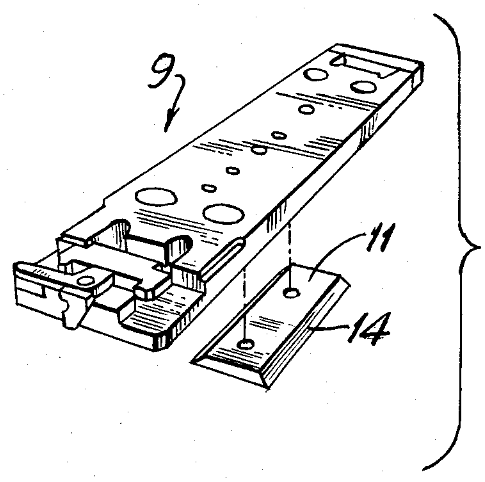
FIG. 1A is a perspective view showing the usual camera tripod adaptor plate in relation to a mounting plate to secure the camera to the tilt-pan head of this invention.

The mounting plate 10 is secured by bolting to the bottom of the usual adaptor plate 9 as schematically shown in FIG. 1A.

Figure 2:
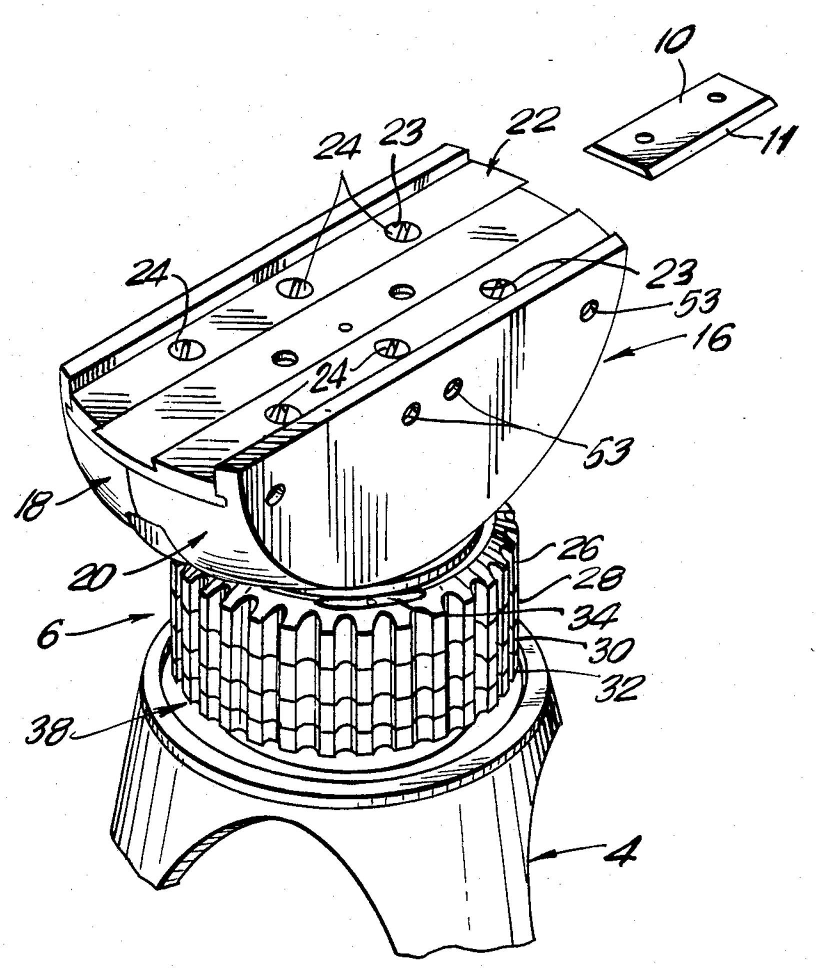
FIG. 2 is an enlarged perspective view of the tilt pan head of the present invention secured to the top of a supporting tripod.
Figure 5:
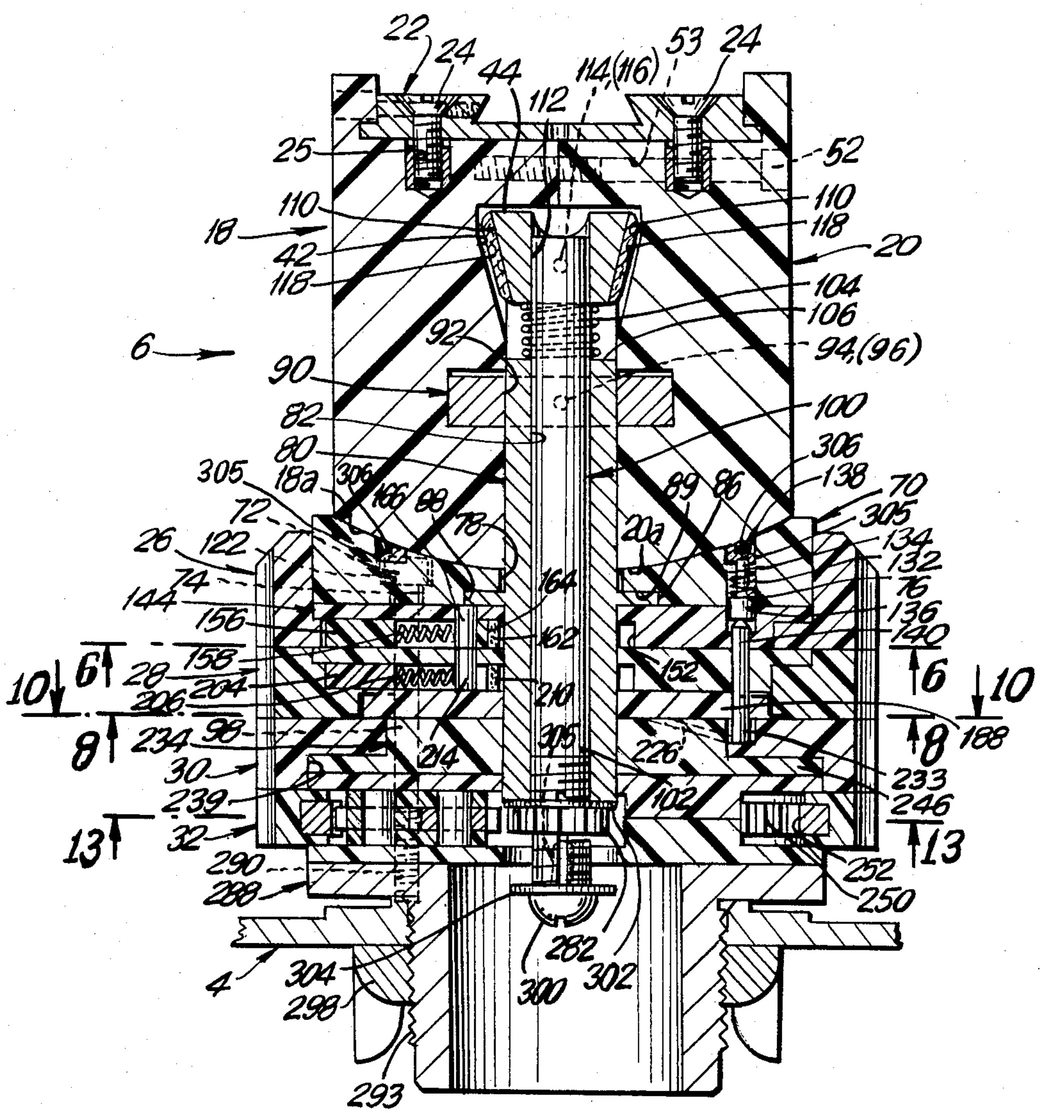
FIG. 5 is a sectional view along lines 5—5 of FIG. 3.
Figure 15:
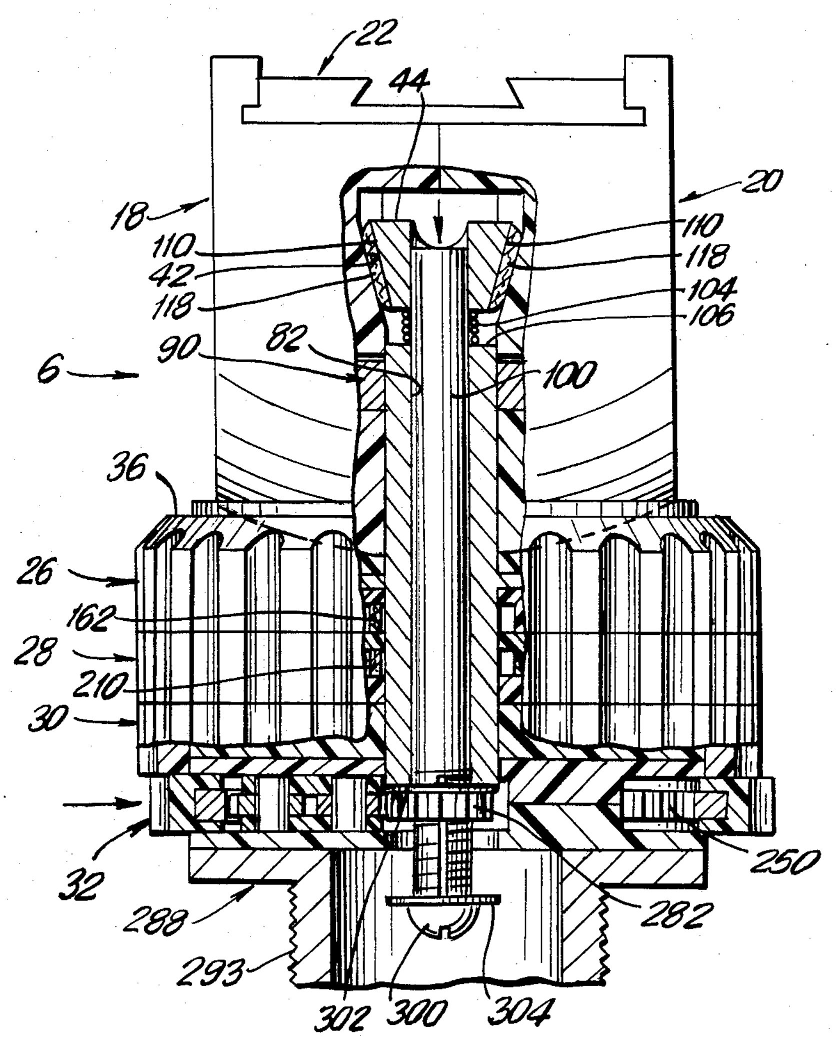
FIG. 15 is a view partially in section along lines 15—15 of FIG. 14 and the securing and panning column in section and plan view of the remainder of the head.

Referring particularly to FIGS. 2, 5 and 15, the tilt head 16 is comprised of machined hemispheres 18 and 20 which retain the mounting plate 22 by means of screws 24 passing through apertures 23 in the mounting plate 22 into threaded recesses 25 in the top surfaces 19 and 21 of the hemispheres 18 and 20.

In FIG. 2 the knurled control rings of the device 6 are shown generally; the top ring 26 controlling the panning friction, the second ring 28 controlling the panning lock, the third ring 30 controlling tilt and pan lock, and the fourth ring 32 controlling tilting friction.

Spaced on the top surface 36 of the first ring 26 are three spirit levels 34 for facilitating the leveling of the tripod support 4 on which the device 6 and camera 2 are mounted. The upper portion of the heavy duty tripod is indicated at 38.

Each of the hemispheres 18 and 20 is provided with an arcuate recess 40 having tapered walls 42 and a top surface 44. The recess 40 extends through 180 degree arc in the head and opens at each end in the top surface 44.

The hemispheres 18 and 20 are secured together by bolts 52 passing through apertures 53 in the end portions 46 of hemisphere 20 into corresponding threaded recesses 54 in hemisphere 18.

The plate 22 has stepped edges 58 which correspond with the recesses 60 and 62 of the hemisphere 18 and 20. Four set screws 66 pass through threaded apertures 64 in edge wall 65 of hemisphere 18 and through aperatures 27 in upper portion 21 of the side 23 of the plate 22 to hold it in place and to bear against the beveled edge 11 of adapter plate 10 which fits in the recess 29 of mounting plate 22.

A dished out plate 70 serves as a base for the hemispheres 18 and 20. The contoured face 41 thereof corresponds to the contour of the bottoms 18*a* and 20*a* of the hemispheres 18 and 20. The plate 70 fits rotatably within the annular internal shoulder 72 of the first ring 26 and has three larger apertures 74 equally spaced, and an additional three equally spaced but smaller aperatures 76 passing through it as shown.

Figure 2A:
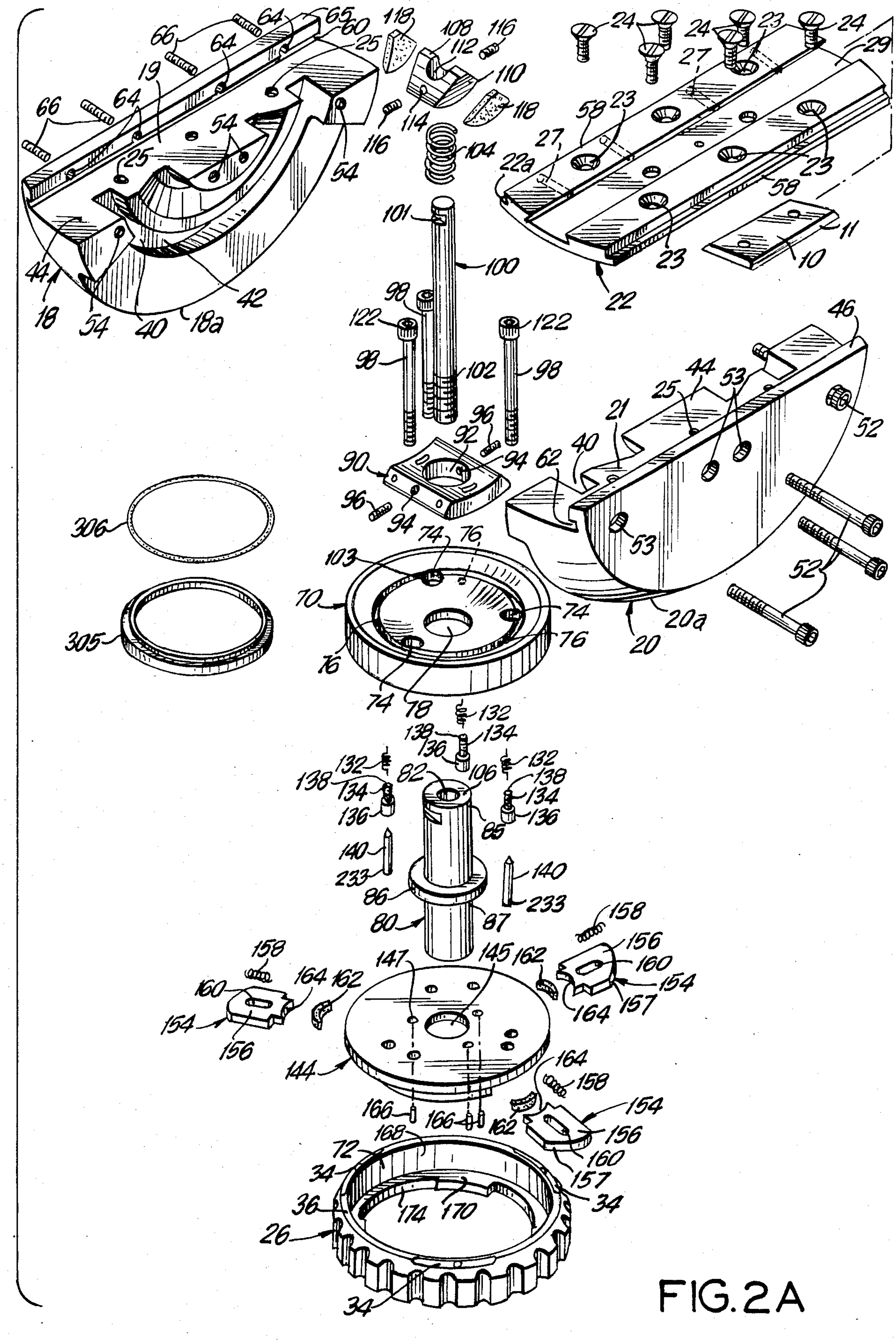
FIG. 2A is a perspective exploded assembly view of the upper portion of the assembly of the tilt pan head of the present invention.

A central aperture 78 is also formed in the plate 70 through which passes the securing and panning column 80. The column 80 has a longitudinal central bore 82 and as shown in FIG. 2A has flattened sections 84 on either side of the top portion 85. An annular flat ring 86 is formed on the intermediate portion 87 of the column 80 and is dimensional to fit in the annular recess 88 on the lower surface 89 of the plate 70.

A tilt guide block 90, arcuate in form corresponding to the recesses in the hemispheres 18 and 20 is secured to the upper end of the column 80 by means of set screws 96 through transverse threaded apertures 94 in the plate 90. The screws 96 bear against the flat portions 84 of the column 80 as shown.

The tilt guide plate 90 is provided with a central aperture 92 through which the column 80 passes. Threaded bolts 98 pass through the apertures 74 in the plate 70 with the heads 122 thereof bearing on countersunk shoulders 103. The bolts 98 pass through corresponding apertures in each level of the assembly and finally into threaded apertures 290 in base ring 288 to secure the assembly together.

A tilt assembly central shaft 100 has a threaded lower portion 102 and a flattened portion 101 on either side of the upper section of the shaft. A spring 104 surrounds upper section of the shaft 100 intermediate of the top surface 106 of the column 80 and wedge block 108. The wedge 108 has tapered sides 110, and a central aperture 112. Transverse threaded apertures 114 are provided and set screws 116 secure the wedge block 108 to the upper end of the shaft 100.

Friction pads 118 are adhesively secured to the tapered sides 110 of the wedge 108.

The heads 122 of the bolts 98 bear against the shoulders 130 formed in the apertures 74 of the plate 70.

Located in the smaller threaded apertures 76 of the plate 70 are pins 134 having a base 136 and a threaded upper end 138 secures a retaining ring 305 on top surface of the top of plate 70 by the cooperation with threaded aperatures 76.

Held on the ring 315 is an O ring 306 of resilient material which when the assembly is released is at a just below the face surface of plate 70. When the push rods 140 are raised as described, the O ring frictionally bears against the hemispheres 18 and 20 to lock both pan and tilt upon rotation of the third ring.

Springs 132 bias the pins 134 downwardly by bearing against base 136 which in turn rest on push rods 140 which extend through the assembly down to inclined ramps formed on ring 30.

A pan guide plate 144 has equally spaced cutouts 152 for slide assemblies 154.

Figure 6:
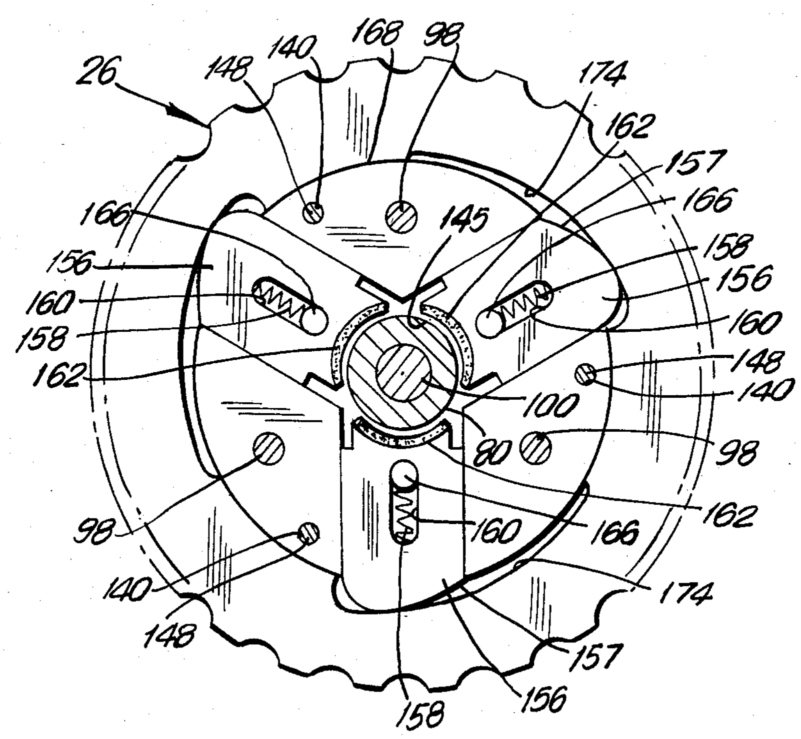
FIG. 6 is a sectional view along line 6—6 of FIG. 5 showing the camming action of the uppermost control ring on the control slide assemblies for the panning inhibition.
Figure 7:
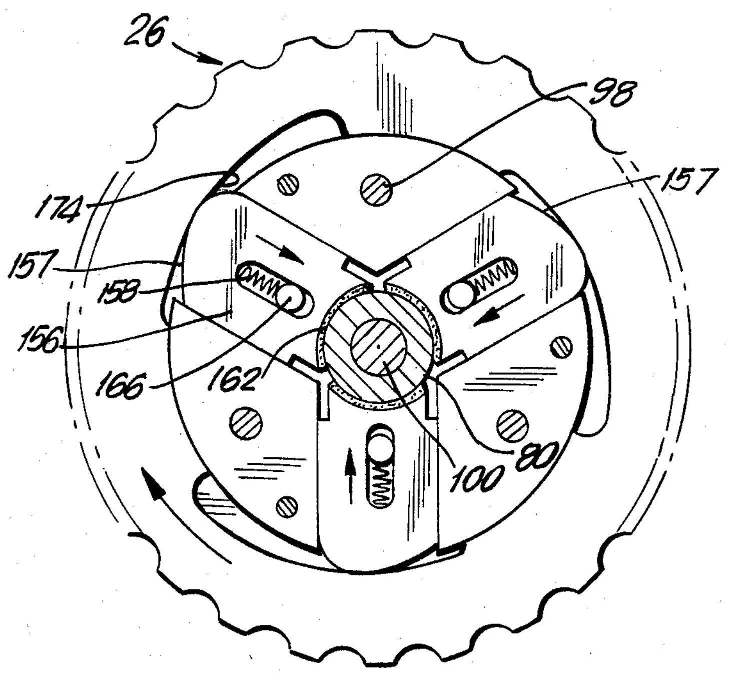
FIG. 7 is the same view as FIG. 6 showing the slide assemblies engaging the panning column.
Figure 8:
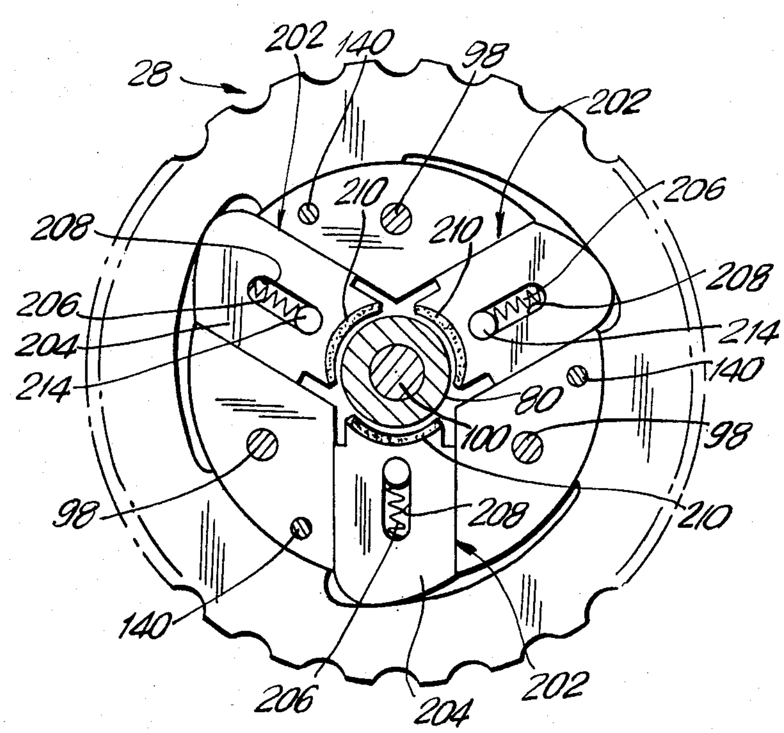
FIG. 8 is a view taken along line 8—8 of FIG. 5 showing the camming action of the second control ring on slide assemblies to pan lock.
Figure 9:
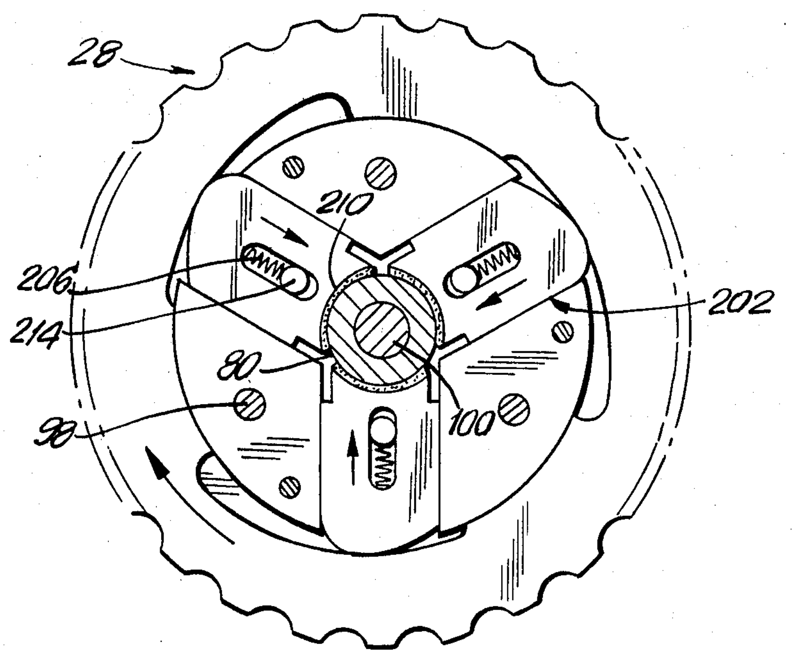
FIG. 9 is similar to FIG. 8 showing the slide assemblies engaging the panning column to lock.
Figure 10:
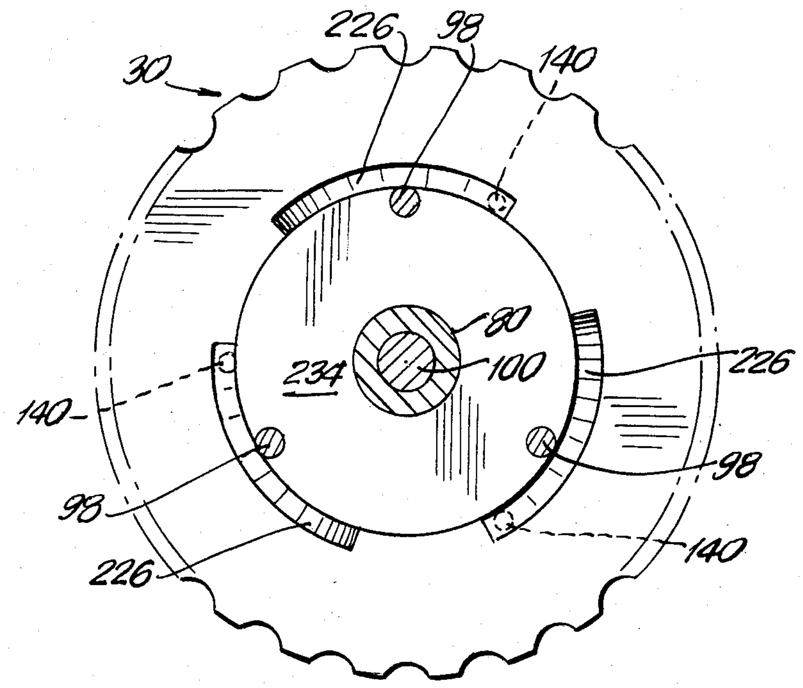
FIG. 10 is a view along line 10—10 of FIG. 5
Figure 11:
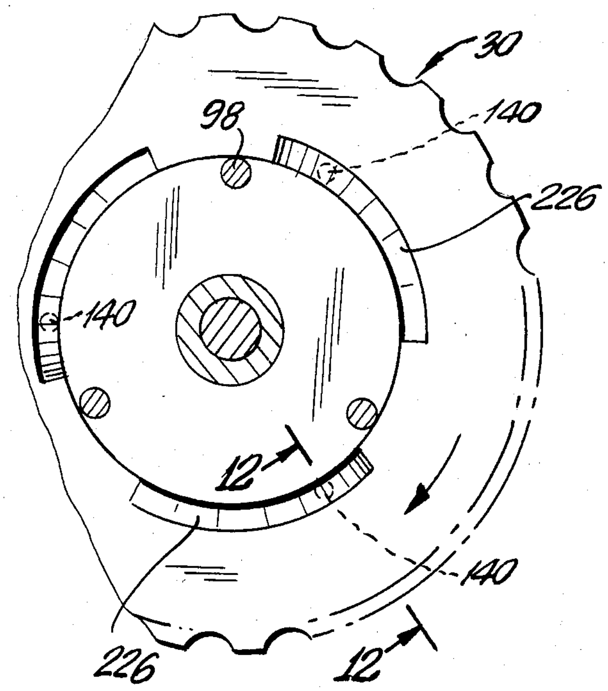
Figure 12:
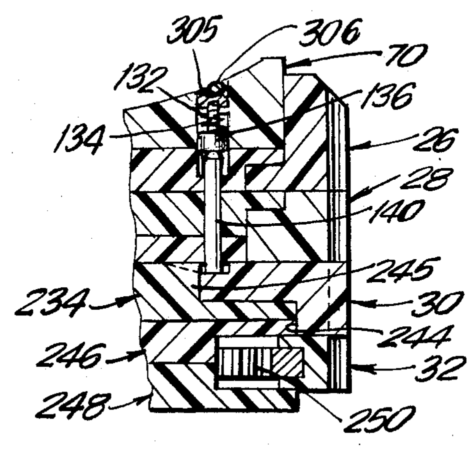
FIG. 12 is a similar view showing the positioning of push rods upon the turning of the third ring to lock both tilting and panning.
Figure 13:
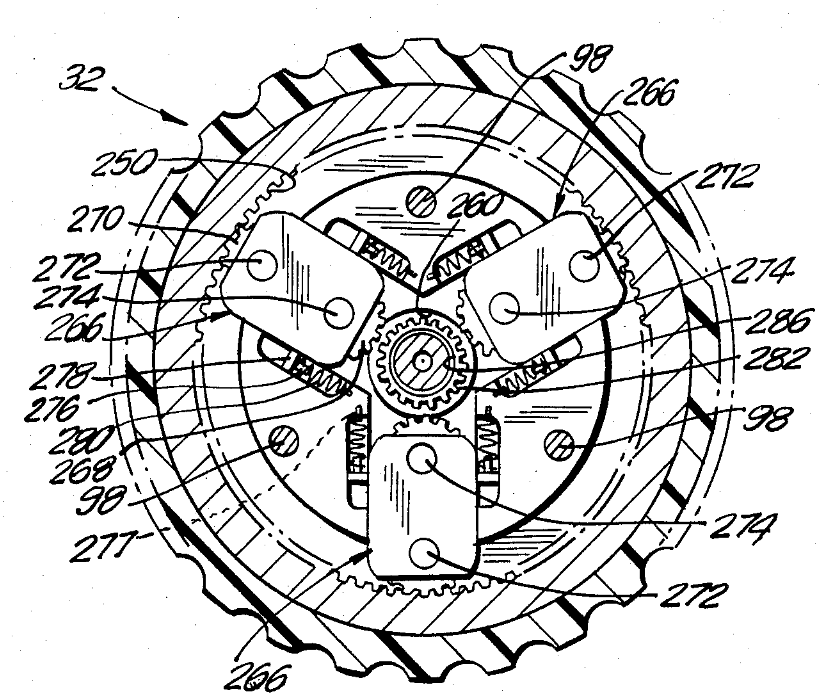
FIG. 13 is a view taken along lines 13—13 of FIG. 5 showing the planetary gear mechanism of the lowest control ring for raising and lowering the tilt assembly central shaft.
Figure 14:
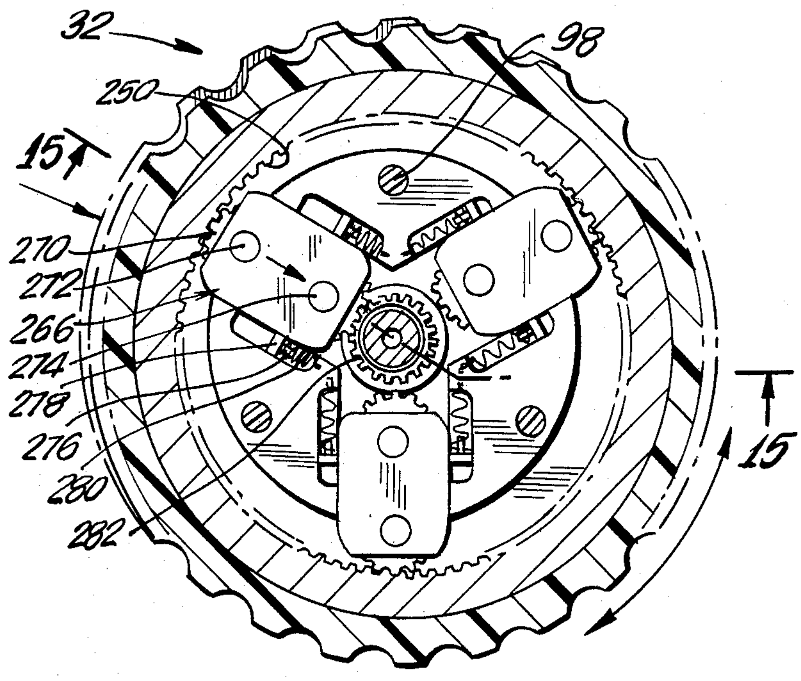
FIG. 14 is a similar view as FIG. 13 showing engagement of the gears to mbve the tilt assembly central shaft.

Slide assemblies 154 are located within the ring 26 sandwiched between the pan plates 144 and 188. The three slide assemblies 154 are comprised of the slides 156 which are biased outwardly by springs 158 and guided in the slot 160 and bearing against pins 166. The inner faces 164 of the slides 156 are provided with friction pads 162 which are adhesively secured to the face 164. The outer surfaces 157 of the slides have a cammed curvature as best shown in FIGS. 6 and 7. The pins 166 which slide in the slots 160 of the slides 156 are retained in apertures 147 in the pan guide plate 144.

On the inner face or annular wall 168 of ring 26 on the ledge 170 are formed arcuate cam surfaces 174.

Between ring 26 and 28 is located a second pan guide plate 188.

The second pan guide plate 188 is of the same structure as the first pan guide plate 144. The guide plate 188 has three equispaced radial slots 200 for slide assemblies 202, as is provided with aperture 194 for guide pins 214, aperture 196 for bolts 98 and apertures 198 for push rods 140. Slide assemblies 202 are located in the slots 200 and comprise slides 204, springs 206 located in slots 208 and bearing against pins 214. Friction pads 210, are adhesively secured to the faces 212 of slides 204. Outer faces 209 are formed to bear against the cammed face 215 of the inner surface 216 of ring 28.

Below the pan guide plate 188 in the assembly is the spacer ring 218 having a central aperature 219 through which the securing and panning column 80 passes, aperatures 220 for bolts 98, and smaller aperatures 222 for push rods 140.

The third ring 30 has an an annular inner wall 224 with three inclined ramps 226 formed on the upper face 227 thereof. Each ramp 226 has a high end 228 and a low end 230.

The bottoms 233 of the push rods 140 rest on the ramps 226 and are cammed up or down by rotation of third ring 30. Within ring 30 and extending under annular ledge 236 of ring 30 is a stepped base and spacer plate 234. The wall 238 of the plate is in rotating relationship with the inner wall face 224 of ring 30 and outer edge 242 of spacer 234 is also in rotating relationship with the inner face wall 239 of ring 30. The recess 244 of ring 30 extends downwardly a distance to accommodate both base plate 234 and the annular top plate 245 of upper gear guide plate 246 as best shown in FIG. 5. Apertures 240 are provided for bolts 98.

Figure 2B:
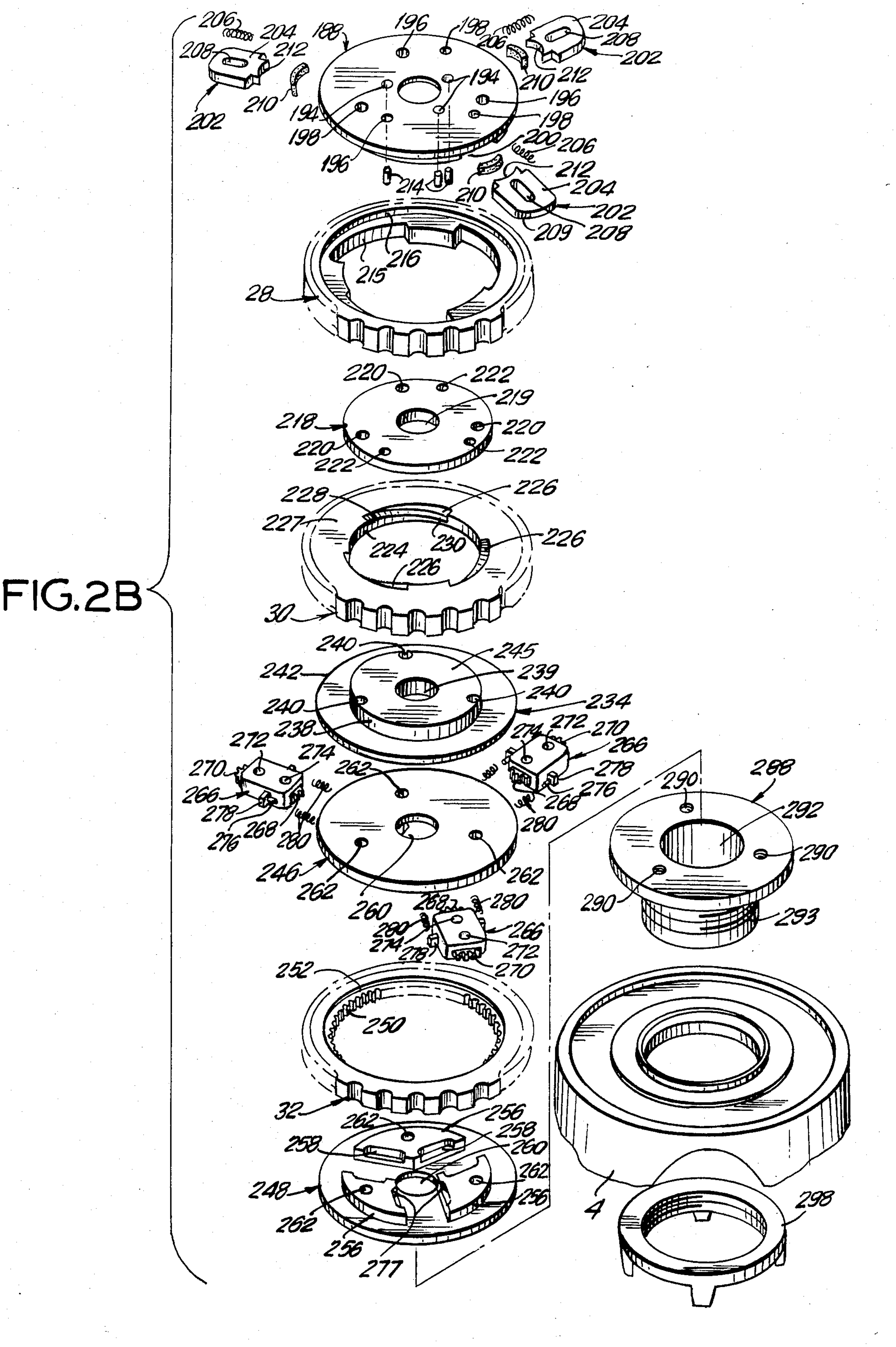
FIG. 2B is a perspective exploded assembly view of the lower portion of the tilt pan head.
Figure 3:
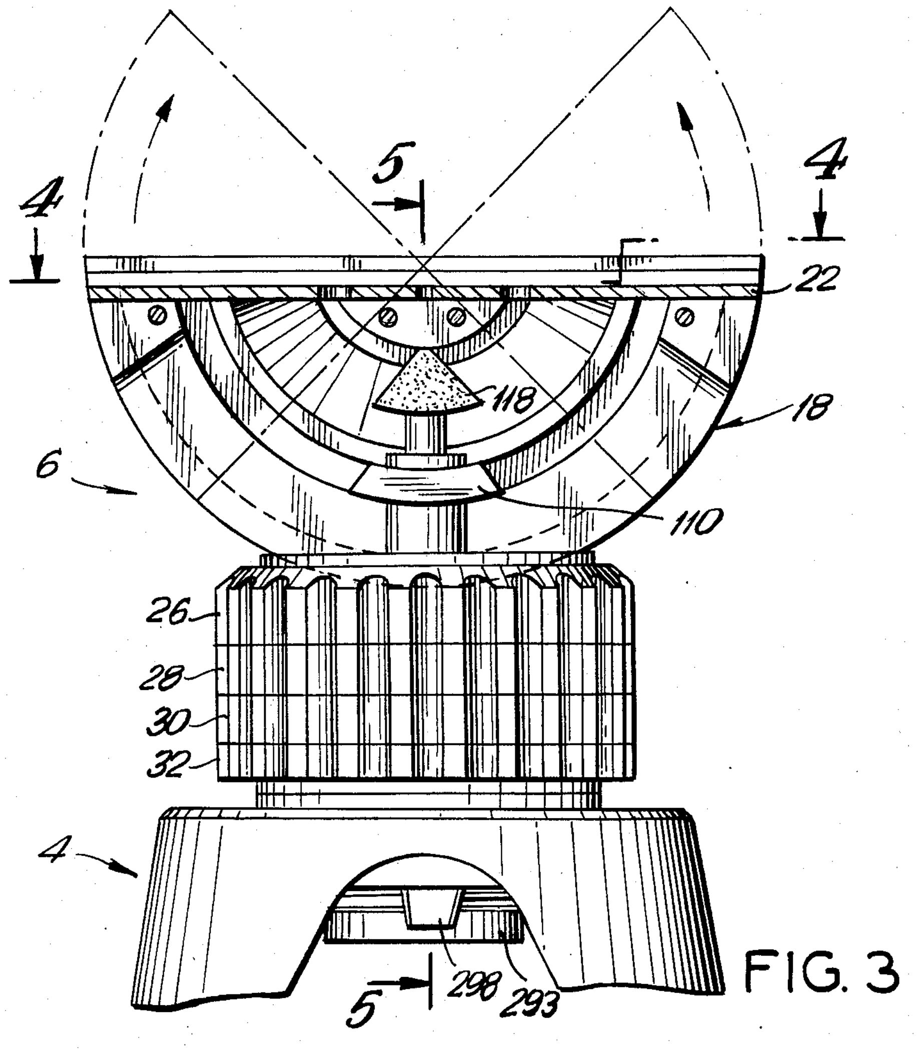
FIG. 3 is a side view partially in section showing the tilt operation of the support head.
Figure 4:
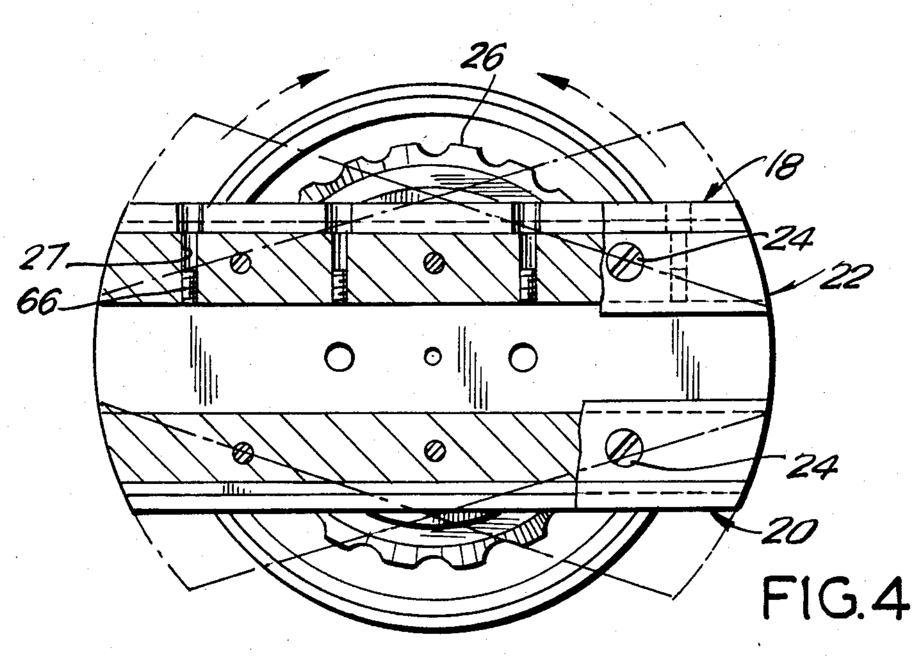
FIG. 4 is a sectional view along line 4—4 of FIG. 3 showing the panning movement of the head of the present invention.

The fourth ring 32 is provided on its inner face with planetary gear 250 extending from the recessed surface 252 as shown in FIG. 2B and FIG. 5. The upper gear guide plate 246 and the lower gear guide plate 248 are of similar construction, each having the apertures 262 for bolts 98, pie shaped section 256 defining spaces for gear carriers 266. Each pie section 256 has recesses 258 formed therein to accommodate springs 280 which bias the gear carriers 266 outwardly. Each of the gear carriers has a pair of gears 268 and 270 carried on shafts 272 and 274 respectively running through the gear carrier 266. The teeth of the gears 268 and 270 extend from the ends of the carriers 266, and mesh together within the carriers 266. On each carrier 266 extensions 278 are formed having spring retaining pins 276 are seated at the opposite in holes 277 in sections 256. Keyed or threaded on the lower end of the shaft 100 is a floating gear which matches the gears 268 and 270 on the carriers 266.

Internal threads of the gear 282 match threads 286 on the lower portion 102 of shaft 100 running through column 80.

Below ring 32 is the base ring 288 having a large central aperture 292 therein depending neck 293 with and external threads 294. The downwardly extending neck 293 is threaded into a corresponding aperture in the top of the tripod 4 and secured thereto by the threaded ring 298. In the top surface of ring 288 are threaded apertures 290 which receive the bolts 98 to hold the assembly together. The lower end of the shaft 100 as shown in FIGS. 5 and 15 is provided with keyed washers 302 and 304 above and below the floating gear 282 which are retained in place by a self locking bolt or screw 300 retained within a central threaded aperture 305 in the bottom of central shaft 100.

Figure 16:
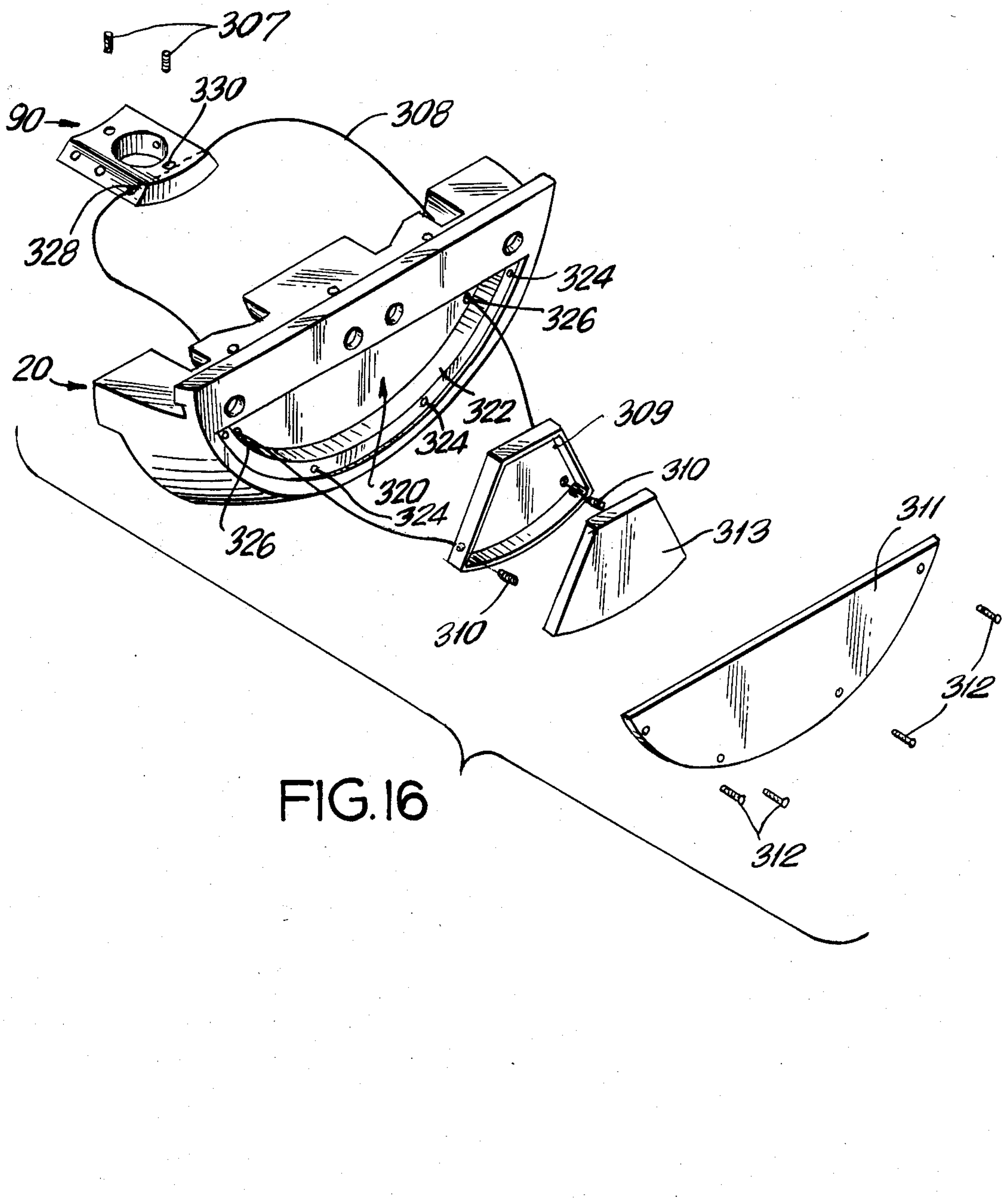
FIG. 16 is a perspective view of an exploded assembly view showing an alternative embodiment incorporating a counter-balance system.

In FIG. 16 an alternate embodiment of the invention is shown which provides a counter balancing effect when the camera is tilted. The hemisphere 20 has a portion of the outer surface machined away to produce and define the chamber 320 having walls 322 and with threaded aperatures 324 facing outwardly to receive retaining screws 312 which hold a cover plate 311 corresponding in shape to the opening of the chamber 320 and the hemisphere 20. A pair of apertures 326 are bored through the back wall of the chamber 20 to the other side of the hemisphere 20. A wire string passes through these aperatures 326 and through a tranverse bore and tilt plate guide 90 and is secured thereto by threaded screws 307 placed in threaded aperatures 330. The other ends of the wire 308 are secured in arcuate shaped container 309 which may be filled with weights. The wire 308 again is held in place by returning screws 310. A snap cover 313 isprovided. The wire 308 is adjusted so that it is snug and it will be seen as the hemispheres are tilted downwardly in one direction. Since the wire is of a constant length it will be pulled up towards the high side away from the tilted direction and serve as a counter balance.

Although the invention has been described by reference to an illustrative embodiment, it is not intended that the novel device be limited thereby, but that modifications thereof are intended to be included as falling within the broad spirit and scope of the foregoing disclosure, the following claims and the appended drawings.

What is claimed is:

1. An improved tilt-pan head device wherein tilt frictional drag, panning frictional drag, panning lock, and tilting and means adapted to mount said device on a support base, a hollow central cylindrical control column, a control shaft running longitudinally through said column, frictional means secured at the top of said control shaft and biased upwardly, a pair of hemispheres releaseably secured together and slidingly secured to said control column, a mounting plate secured to the top surface of said hemispheres and adapted to retain an adapter plate thereon, said hemispheres cradled on an annular dished plate moveable about a horizontal axis and about a vertical axis, four control rings stacked horizontally one upon the other and about said cylindrical control column, and between said support base and said dished plate, a first of said control rings having cammed interior surfaces, slide assemblies within said first control ring biased away from said control column and moveable to engage said control column with frictional means to produce a panning drag upon rotation of said first control ring, a second control ring having a cammed interior surface, slide assemblies within said second contol ring biased away from said control column and moveable to engage said control column with frictional means to lock panning motion upon rotation of said second control ring, a third control ring, an arced inclined plane on the upper surface thereof, at least one vertical pin means resting on said inclined plane and extending upwardly, and biased downwardly away from engagement with said hemispheres but moveable upwardly to engage said hemispheres and inhibit both tilting and panning movements, a fourth control ring, gear means within said fourth control ring operable when said fourth control ring is rotated to engage a floating gear means on the threaded lower portion of said control shaft, whereby rotation of said fourth control ring will lower said shaft and engage frictional means at the top of said shaft with said hemispheres to produce tilt drag upon rotation of said fourth control ring.

2. A device as claimed in claim 1 wherein said control rings are arranged in the order: said first control ring, said second control ring, said third control ring, said forth control ring, one under the other in the foregoing order, with a common axis.

* * * * *